United States Patent Office 3,106,566
Patented Oct. 8, 1963

3,106,566
PHOSPHOROTHIOLOTHIONATE DERIVATIVES OF CYANOACRYLATES
Marvin A. McCall and Richard L. McConnell, Kingsport, Tenn., assignors to Eastman Kodak Company, Rochester, N.Y., a corporation of New Jersey
No Drawing. Filed Feb. 9, 1962, Ser. No. 172,086
6 Claims. (Cl. 260—332.2)

This invention relates to new organophosphorus compounds and to their method of preparation. In a specific aspect this invention relates to the preparation of new organophosphorus compounds by the reaction of dialkyl phosphorothiolothionates with α-cyanoacrylates and to the products of this process.

This is a continuation-in-part of our copending application Serial No. 705,800, filed December 30, 1957, now abandoned.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl phosphorothiolothionates with α-cyanoacrylates. The new products of this invention have the structural formula:

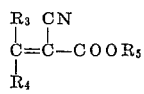

wherein $R_1$ and $R_2$ are selected from the group consisting of lower alkyl radicals and chlorinated lower alkyl radicals (chloroethyl, chloropropyl, trichloroethyl, and the like), $R_3$ is selected from the group consisting of hydrogen and low alkyl, $R_4$ is selected from the group consisting of lower alkoxy, nitrophenyl (ortho-, meta-, para-), chlorophenyl (ortho-, meta-, para-), furyl, thienyl and pyridyl, and $R_5$ is selected from the group consisting of lower alkyl and phenyl.

The compounds of this invention are prepared by reacting a dialkyl phosphorothiolothionate having the structural formula:

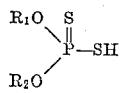

with an α-cyanoacrylate having the structural formula:

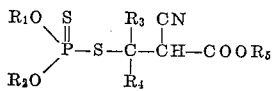

wherein $R_1$, $R_2$, $R_3$, $R_4$ and $R_5$ are as defined above.

In the practice of this invention we prefer to add one of the reactants gradually to a reactor containing the other reactant. For example, the cyanoacrylate can be added gradually to a reactor containing the dialkyl phosphorothiolothionate. Alternatively however, the reverse procedure of addition of reactants can be used and the dialkyl phosphorothiolothionate can be added to a reactor containing the cyanoacrylate. When the cyanoacrylate polymerizes readily, it is preferred to add this reactant gradually to the phosphorothiolothionate. The substituted cyanoacrylates, such as benzylidenecyanoacetate and the alkylidenecyanoacetates, do not polymerize readily, and when these reactants are used either method of addition is suitable. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the dialkylphosphorothiolothionate will react with the cyanoacrylate in the absence of a catalyst. If it is considered desirable to employ a catalyst, there are certain catalysts that can be used. For example, the tertiary amines, such as triethyl amine, and the like, are quite suitable.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, the ratio of reactants can be varied rather widely.

The dialkylphosphorothiolothionates that are used in our invention can be prepared by the known reaction of 4 moles of an aliphatic alcohol with one mole of phosphorus pentasulfide. The alkyl and aryl α-cyanoacrylates can be made by depolymerizing a polymeric ester of α-cyanoacrylic acid by heating the polymer in a tertiary ester of phosphoric acid at a temperature above the melting point of the polymer and at a pressure below 15 mm. of mercury as described in U.S. 2,756,251. The β-substituted acrylates can be prepared by reacting alkyl or aryl cyanoacetic acid ester with the appropriate aldehyde by a procedure similar to that described in Organic Syntheses, vol. 25, pages 42 and 46 (1945), published by John Wiley and Sons, Inc.

The following examples are illustrative of the compounds within the scope of this invention, their method of preparation and their utility as insecticides.

*Example 1.—Methyl 2-Cyano-3-(o-Nitrophenyl)-3-(O,O-Dimethylphosphorothiolothiono)Propionate*

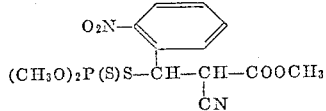

This compound was made by the addition of methyl (o-nitrobenzylidene)-cyanoacetate (0.1 mole) dissolved in benzene to O,O-dimethyl phosphorothiolothionate with stirring. A few drops of triethylamine was added as catalyst. After the addition was complete, the reaction was heated on a steam bath for 1 hour to complete the reaction. The product was obtained as a dark oil after removing the benzene solvent under vacuum.

*Example 2.—Methyl 2-Cyano-3-(p-Chlorophenyl)-3-(O,O-Diethylphosphorothiolothiono)Propionate*

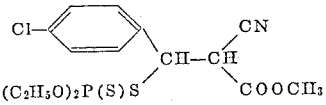

This compound was made by the addition of methyl (p-chlorobenzylidene)-cyanoacetate (0.1 mole) in carbon tetrachloride solvent to O,O-diethyl phosphorothiolothionate (0.1 mole) with stirring. A small amount of triethylamine was used as catalyst. The dark oily product was obtained after the solvent was removed under reduced pressure.

*Example 3.—Methyl 2-Cyano-3-(2-Furyl)-3-(O,O-Diethyl Phosphorothiolothiono)Propionate*

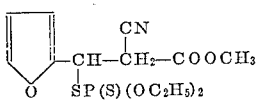

This compound was prepared by the same general procedure given in Example 1 except that benzene was used as a solvent and triethylamine as catalyst. The reactants were methyl 2-furfurylidenecyanoacetate (0.1 mole) and O,O-diethyl phosphorothiolothionate (0.1 mole). The product was obtained as an oil after removing the solvent under reduced pressure.

*Example 4.—Butyl 2-Cyano-3-(2-Thienyl)-3-(O,O-Diethyl Phosphorothiolothiono)Propionate*

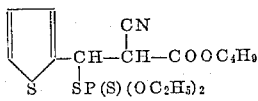

This compound was prepared from butyl 2-thienylidene cyanoacetate (0.1 mole) and O,O-diethyl phosphorothiolothionate (0.1 mole) by the same general procedure described for Example 3.

*Example 5.—Methyl 2-Cyano-3-(2-Pyridyl)-3-(O,O-Dimethylphosphorothiolothiono)Propionate*

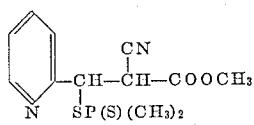

This compound was prepared from methyl 2-(2-pyridyl)methylenecyanoacetate and O,O-dimethyl phosphorothiolothionate by the same general procedure given in Example 1 except that benzene was used as solvent and triethylamine as catalyst for this reaction. The dark oily product had excellent pesticidal properties.

*Example 6.—Methyl 2-Cyano-3-Ethoxy-3-(O,O-Diethylphosphorothiolothiono)Butyrate*

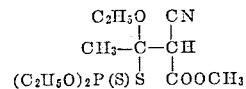

This compound was prepared by the addition of methyl 2-cyano-3-ethoxycrotonate to O,O-diethyl phosphorothiolothionate according to the procedure of Example 1.

*Example 7.—Use of Compounds as Insecticides*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in petri dishes and observed after 24 hours for mortality among the adult mites. It should be noted that tests using acetone-water solutions (containing none of the toxicant) kill none of the mites.

|  | Concentration of toxicant in p.p.m. | Percent Kill Mites |
|---|---|---|
| 1. Methyl 2-Cyano-3-(o-nitrophenyl)-3-(O, O-diethyl phosphorothiolothiono) propionate (Ex. 1). | 100<br>30<br>10 | 100<br>92<br>89 |
| 2. Methyl 2-Cyano-3-(2-pyridyl)-3-(O, O-diethyl phosphorothiolothiono) propionate (Ex. 5). | 100<br>30<br>10 | 100<br>95<br>90 |

The compounds of Examples 2, 3, 4, and 6 were similarly effective when used in the above tests.

We claim:
1. The organophosphorus compounds having the structural formula:

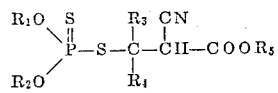

wherein $R_1$ and $R_2$ are selected from the group consisting of lower alkyl and chloro-lower alkyl, $R_3$ is selected from the group consisting of hydrogen and lower alkyl, $R_4$ is an organic radical selected from the group consisting of lower alkoxy, nitrophenyl, chlorophenyl, furyl, thienyl and pyridyl and $R_5$ is selected from the group consisting of lower alkyl and phenyl.

2. As a composition of matter, methyl 2-cyano-3-(o-nitrophenyl)-3-(O,O-dimethyl phosphorothiolothiono)-propionate having the formula:

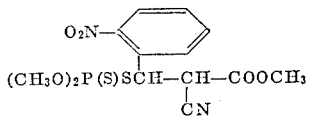

3. As a composition of matter, butyl 2-cyano-3-(2-thienyl)-3-(O,O-diethyl phosphorothiolothiono)propionate having the formula:

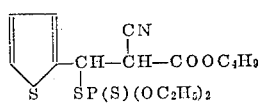

4. As a composition of matter, methyl 2-cyano-3- ethoxy-3-(O,O-diethyl phosphorothiolothiono)butyrate having the formula:

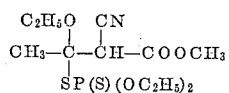

5. As a composition of matter, methyl 2-cyano-3-(2-furyl)-3-(O,O-diethyl phosphorothiolothiono)propionate having the formula:

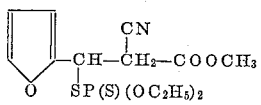

6. As a composition of matter, methyl 2-cyano-3-(p-chlorophenyl) - 3 - (O,O-diethylphosphorothiolothiono)-propionate having the formula:

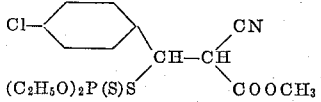

References Cited in the file of this patent

UNITED STATES PATENTS

| | | |
|---|---|---|
| 2,826,530 | Eddy et al. | Mar. 11, 1958 |
| 2,889,330 | Baker et al. | June 2, 1959 |
| 2,947,662 | Fusco et al. | Aug. 2, 1960 |
| 2,957,007 | McCall et al. | Oct. 18, 1960 |

OTHER REFERENCES

Chemical Abstracts, volume 48, pages 556i, 557a, 1954.
Chemical Abstracts, volume 48, page 6639, 1954.